(12) United States Patent
On et al.

(10) Patent No.: US 11,762,733 B2
(45) Date of Patent: Sep. 19, 2023

(54) QUANTUM COMPUTING SYSTEM AND OPERATION METHOD THEREOF

(71) Applicant: Electronics and Telecommunications Research Institute, Daejeon (KR)

(72) Inventors: Jin Ho On, Sejong-si (KR); Chei-Yol Kim, Sejong-si (KR); SooCheol Oh, Daejeon (KR); Gyuil Cha, Daejeon (KR); Hee-Bum Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 182 days.

(21) Appl. No.: 17/471,591

(22) Filed: Sep. 10, 2021

(65) Prior Publication Data
US 2022/0164253 A1 May 26, 2022

(30) Foreign Application Priority Data

Nov. 23, 2020 (KR) .................. 10-2020-0158041
Mar. 17, 2021 (KR) .................. 10-2021-0034731

(51) Int. Cl.
*G06F 11/00* (2006.01)
*G06F 11/10* (2006.01)
*G06N 10/00* (2022.01)

(52) U.S. Cl.
CPC ......... *G06F 11/1044* (2013.01); *G06N 10/00* (2019.01)

(58) Field of Classification Search
CPC .... G06F 11/1044; G06N 10/00; G06N 10/40; G06N 10/70; G06N 10/80

USPC .................................. 714/752, 799
See application file for complete search history.

(56) References Cited

U.S. PATENT DOCUMENTS

| | | | |
|---|---|---|---|
| 10,171,088 B1 | 1/2019 | Kim et al. | |
| 10,833,238 B2* | 11/2020 | Shao ............. | H10N 60/0912 |
| 11,636,372 B2* | 4/2023 | Inoue ............. | G06N 10/00 |
| | | | 706/62 |
| 2018/0308007 A1* | 10/2018 | Amin ............. | G06N 3/047 |
| 2019/0164076 A1 | 5/2019 | Kim et al. | |
| 2020/0075833 A1* | 3/2020 | Topaloglu ....... | H10N 60/805 |
| 2020/0119251 A1* | 4/2020 | Yohannes ........ | H01L 24/81 |

(Continued)

*Primary Examiner* — Kyle Vallecillo
*Assistant Examiner* — Osman M Alshack
(74) *Attorney, Agent, or Firm* — KILE PARK REED & HOUTTEMAN PLLC

(57) ABSTRACT

Disclosed is a quantum computing system including a first quantum chip including first physical qubits, a second quantum chip including second physical qubits, and a management device. The management device includes a physical qubit layer that manages physical qubit mapping including information about physical channels between first and second physical qubits, an abstraction qubit layer that manages abstraction qubit mapping including information about abstraction qubits and abstraction channels between the abstraction qubits based on the physical qubit mapping, a logical qubit layer that divides the abstraction qubits into logical qubits and to manage logical qubit mapping including information about logical channels between the logical qubits, based on the abstraction qubit mapping, and an application qubit layer that allocates at least one logical qubit corresponding to a qubit request received from a quantum application program based on the logical qubit mapping.

16 Claims, 9 Drawing Sheets

(56) References Cited

U.S. PATENT DOCUMENTS

| | | | |
|---|---|---|---|
| 2020/0218842 A1 | 7/2020 | Itoko et al. | |
| 2020/0219003 A1 | 7/2020 | Gazda et al. | |
| 2020/0313879 A1 | 10/2020 | Hong et al. | |
| 2021/0012233 A1* | 1/2021 | Gambetta | G06F 8/44 |
| 2021/0049498 A1* | 2/2021 | Liu | G06N 20/00 |
| 2021/0076530 A1* | 3/2021 | Hart | G06F 1/20 |
| 2021/0201187 A1* | 7/2021 | Olivadese | G06N 10/00 |
| 2021/0305165 A1* | 9/2021 | Shao | H01L 24/81 |
| 2022/0020715 A1* | 1/2022 | Lewandowski | H01L 25/0657 |
| 2022/0164692 A1* | 5/2022 | Inoue | G06N 20/10 |

* cited by examiner

QUANTUM COMPUTING SYSTEM AND OPERATION METHOD THEREOF

CROSS-REFERENCE TO RELATED APPLICATIONS

This application claims priority under 35 U.S.C. § 119 to Korean Patent Application No. 10-2020-0158041 filed on Nov. 23, 2020 and Korean Patent Application No. 10-2021-0034731 filed on Mar. 17, 2021, in the Korean Intellectual Property Office, the disclosures of which are incorporated by reference herein in their entireties.

BACKGROUND

Embodiments of the present disclosure described herein relate to a computing system, and more particularly, relate to a quantum computing system and an operating method thereof.

In general, a computer stores and processes information based on bits composed of 0 and 1. On the other hand, unlike a conventional computer, a quantum computer, which is being actively researched recently, processes information by using a superposition feature of a qubit capable of processing or having 0 and 1 at the same time.

The quantum computer is being actively studied by various companies.

Nowadays, the quantum computer is in an initial development stage in which a qubit having the error of about 50 pieces of information is supported, and has not yet been commercialized. However, in the future, a quantum computer or quantum hardware that supports large-scale qubits may be developed. Accordingly, it is necessary to develop an operating system or software for efficiently processing large-scale qubits.

SUMMARY

Embodiments of the present disclosure provide a quantum computing system having improved efficiency and an operating method thereof.

According to an embodiment, a quantum computing system includes a first quantum chip including a plurality of first physical qubits, a second quantum chip including a plurality of second physical qubits, and a management device that manages the first quantum chip and the second quantum chip. The management device includes a physical qubit layer that manages physical qubit mapping including information about physical channels between the plurality of first physical qubits and the plurality of second physical qubits, an abstraction qubit layer that manages abstraction qubit mapping including information about a plurality of abstraction qubits, which correspond to the plurality of first physical qubits and the plurality of second physical qubits, and abstraction channels between the plurality of abstraction qubits based on the physical qubit mapping, a logical qubit layer that divides the plurality of abstraction qubits into a plurality of logical qubits and manages logical qubit mapping including information about logical channels between the plurality of logical qubits, based on the abstraction qubit mapping, and an application qubit layer that allocates at least one logical qubit corresponding to a qubit request received from a quantum application program based on the logical qubit mapping.

In an embodiment, the plurality of first physical qubits and the plurality of second physical qubits have different physical features from one another. The physical features include at least one of a coherence time, an error rate, a gate calculation time, connectivity between qubits, and a quantum information communication execution time between qubits.

In an embodiment, the physical channels of the physical qubit mapping have irregular connectivity between the plurality of first physical qubits and the plurality of second physical qubits.

In an embodiment, the physical qubit mapping further includes information about a device channel between the first quantum chip and the second quantum chip.

In an embodiment, the abstraction channels of the abstraction qubit mapping have regular connectivity between the plurality of abstraction qubits.

In an embodiment, the abstraction qubit layer measures fidelity of each of the plurality of first physical qubits and each of the plurality of second physical qubits and maps a physical qubit, which has fidelity of a reference value or more, from among the plurality of first physical qubits and the plurality of second physical qubits onto the plurality of abstraction qubits.

In an embodiment, the abstraction channels of the abstraction qubit mapping include a swap operation between physical qubits corresponding to the plurality of abstraction qubits.

In an embodiment, the logical qubit mapping divides the plurality of abstraction qubits into the plurality of logical qubits based on a quantum error correction code.

In an embodiment, the number of abstraction qubits included in one of the plurality of logical qubits is determined based on a type of the quantum error correction code.

In an embodiment, the logical qubit layer determines the type of the quantum error correction code based on the number of the plurality of abstraction qubits, the number of the plurality of logical qubits, and an error rate of each of the plurality of logical qubits.

In an embodiment, the quantum computing system further includes a first controller that controls the first quantum chip and a second controller that controls the second quantum chip.

In an embodiment, the quantum computing system further includes a first controller that controls the first quantum chip and the second quantum chip.

In an embodiment, the management device includes a memory that stores a program code for the physical qubit layer, the abstraction qubit layer, the logical qubit layer, and the application qubit layer, a central processing unit that executes the program code stored in the memory, and an interface device that provides communication between the first quantum chip and the second quantum chip.

According to an embodiment of the present disclosure, an operating method of a quantum computing system including a plurality of quantum chips includes generating physical qubit mapping including information about a plurality of physical qubits, which are included in each of the plurality of quantum chips, and physical channels between the plurality of physical qubits based on a physical structure of the plurality of quantum chips, generating abstraction qubit mapping including information a plurality of abstraction qubits, which correspond to the plurality of physical qubits, and abstraction channels between the plurality of abstraction qubits based on the physical qubit mapping, and dividing the plurality of abstraction qubits into a plurality of logical qubits based on the abstraction qubit mapping and generating logical qubit mapping including information about the plurality of logical qubits and logical channels between the plurality of logical qubits. The physical channels of the physical qubit mapping have irregular connectivity between the plurality of physical qubits. The abstraction channels of the abstraction qubit mapping have regular connectivity between the plurality of abstraction qubits.

In an embodiment, the operating method further includes receiving a qubit request from a quantum application program, allocating logical qubits, which correspond to the qubit request, from among the plurality of logical qubits based on the logical qubit mapping, allocating abstraction qubits, which correspond to the allocated logical qubits, from among the plurality of abstraction qubits based on the abstraction qubit mapping, allocating physical qubits, which correspond to the allocated abstraction qubits, from among the plurality of physical qubits based on the physical qubit mapping, and performing a calculation corresponding to the qubit request by using the allocated physical qubits.

In an embodiment, the plurality of quantum chips have different types from one another.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described in detail and clearly to such an extent that an ordinary one in the art easily implements the present disclosure.

Components described in the specification by using the terms "part", "unit", "module", "engine", "layer", etc. and function blocks illustrated in drawings may be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
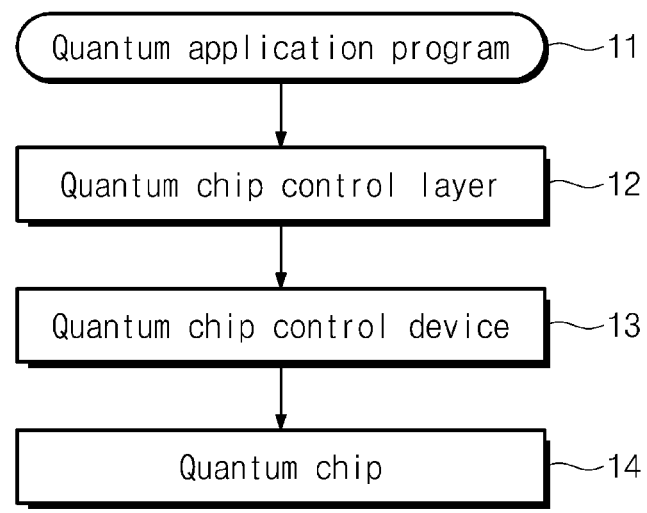
FIG. 1 is a block diagram illustrating an example of a quantum computer system.

FIG. 1 is a block diagram illustrating an example of a quantum computer system. In an embodiment, unlike a conventional computer that processes information in units of bits separated by 0 and 1, a quantum computer may perform complex problem solving or information processing, which it is difficult to solve by using the conventional computer, based on a qubit capable of having 0 and 1 at the same time.

Referring to FIG. 1, a quantum computer 10 may include a quantum application program 11, a quantum chip control layer 12, a quantum chip control device 13, and a quantum chip 14. The quantum application program 11 may be program codes or software that is executed or driven through the quantum computer 10. The quantum application program 11 may be written by a user based on the features of the quantum chip 14.

The quantum chip control layer 12 may control the quantum chip control device 13 based on the quantum application program 11. The quantum chip control device 13 may be configured to drive the quantum chip 14 under the control of the quantum chip control layer 12. In an embodiment, the quantum chip control layer 12 may be a software or firmware layer that performs calculations, conversions, or the like that is necessary to drive the quantum chip 14. The quantum chip control device 13 may be a hardware device configured to provide a physical control signal or data to control the quantum chip 14.

The quantum chip 14 may perform various calculations under the control of the quantum chip control device 13. For example, the quantum chip 14 may include a plurality of qubits. Each of the plurality of qubits may have a superposition feature that has values of 0 and 1 at the same time. The quantum chip 14 may be configured to perform various calculations by using superposition features of a plurality of qubits.

In an embodiment, the number of the plurality of qubits included in the quantum chip 14 shown in FIG. 1 may be several to several tens. Each of the plurality of qubits may have the same type. That is, when the number of the plurality of qubits included in one the quantum chip 14 is relatively small, it is possible to control the quantum chip 14 through a simple hierarchical structure as shown in FIG. 1. On the other hand, when the number of the plurality of qubits included in the quantum chip 14 is relatively great (e.g., tens to hundreds, or more), or when the plurality of qubits are implemented in different types, there is a need for a separate means for efficiently using the plurality of qubits. Hereinafter, it is described that a quantum computing system is capable of efficiently managing or using large-scale physical qubits or different types of physical qubits.

Figure 2:
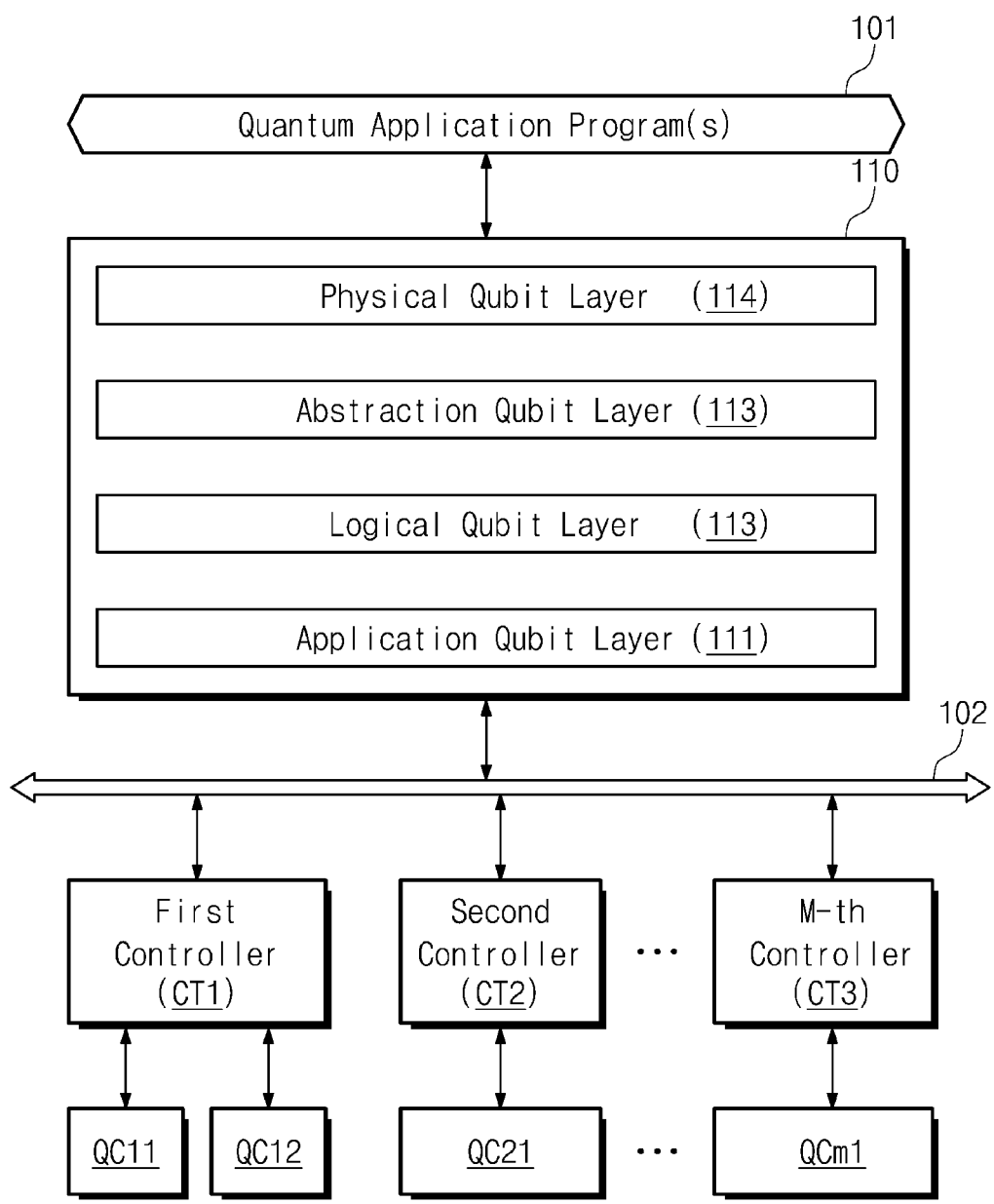
FIG. 2 is a block diagram illustrating an example of a quantum computing system, according to an embodiment of the present disclosure.

FIG. 2 is a block diagram illustrating an example of a quantum computing system, according to an embodiment of the present disclosure. For brevity of illustration and for convenience of description, components unnecessary to describe an embodiment of the present disclosure are omitted. However, the scope of the present disclosure is not limited thereto. A quantum computing system 100 according to an embodiment of the present disclosure may further include various other components not shown in FIG. 2.

Referring to FIG. 2, the quantum computing system 100 may include a quantum application program 101, a system bus 102, a management device 110, a plurality of controllers CT1 to CTm, and a plurality of quantum chips QC11 to QCm1.

The quantum application program 101 may be program codes or software, which is driven or executed by the plurality of quantum chips QC11 to QCm1. In an embodiment, the quantum application program 101 may be written by a user. In an embodiment, the quantum application program 101 may be program code or software designed or written to be optimized for the type of each of the plurality of quantum chips QC11 to QCm1. Alternatively, the quantum application program 101 may be a program code or software written in a predetermined programming language or any programming language, regardless of the type of each of the plurality of quantum chips QC11 to QCm1.

The plurality of controllers CT1 to CTm may be configured to control the plurality of quantum chips QC11 to QCm1. Each of the plurality of quantum chips QC11 to QCm1 may be a physically-separate device. Each of the plurality of quantum chips QC11 to QCm1 may include a plurality of qubits. The plurality of qubits included in each of the plurality of quantum chips QC11 to QCm1 may be implemented in different types. For example, each of the plurality of qubits may be implemented based on various types such as a superconducting qubit, an ion trap qubit, a semiconductor qubit, a photon qubit, and the like.

In an embodiment, a plurality of qubits included in one quantum chip may be implemented in the same type. For example, each of the plurality of qubits included in the quantum chip QC11 may be a superconducting qubit. Each of the plurality of qubits included in the quantum chip QC21 may be an ion trap qubit. However, the scope of the present disclosure is not limited thereto, and the plurality of qubits included in one quantum chip may be implemented in different types.

In an embodiment, quantum chips controlled by one of the plurality of controllers CT1 to CTm may include qubits having the same type. For example, the quantum chips QC11 and QC12 controlled by the first controller CT1 may include superconducting qubits. The quantum chip QC21 controlled by the second controller Ct2 may include ion trap qubits. That is, the plurality of controllers CT1 to CTm may be physically identified based on the types of qubits included in each of the quantum chips.

The system bus 102 may provide communication between the management device 110 and the plurality of controllers CT1 to CTm.

The management device 110 may provide an interface between the quantum application program 101 and the plurality of controllers CT1 to CTm or the plurality of quantum chips QC11 to QCm1. For example, as described above, the plurality of quantum chips QC11 to QCm1 may be implemented based on different types. Because implementation methods of the plurality of quantum chips QC11 to QCm1 are different from one another, the plurality of quantum chips QC11 to QCm1 may have different calculation speeds or physical structures, and types of operators that are supported by the plurality of quantum chips QC11 to QCm1 may be different from one another. In this case, because the quantum application program 101 is not optimized for all the plurality of quantum chips QC11 to QCm1, efficient calculations may be difficult. The management device 110 may generate physical qubit mapping, abstraction qubit mapping, and logical qubit mapping for a plurality of physical qubits included in each of the plurality of quantum chips QC11 to QCm1. The management device 110 may provide the quantum application program 101 with an optimized qubit based on the logical qubit mapping. Alternatively, the management device 110 may change a code of the quantum application program 101 to a code optimized for the plurality of quantum chips QC11 to QCm1.

In an embodiment, the management device 110 may be implemented based on a general-purpose computer or a classic computer, which includes a central processing unit (CPU), a memory, an interface device, and the like. For example, the memory of the management device 110 may be configured to store program codes for a physical qubit layer, an abstraction qubit layer, a logical qubit layer, and an application qubit layer. The program code stored in a memory may be executed by the CPU. The interface device of the management device 110 may provide communication with a plurality of quantum chips or a plurality of controllers.

In an embodiment, for the above-described conversion operation, the management device 110 may include a physical qubit layer 111, an abstraction qubit layer 112, a logical qubit layer 113, and an application qubit layer 114. The physical qubit layer 111 may generate the physical qubit mapping. For example, the physical qubit layer 111 may receive qubit information about the plurality of quantum chips QC11 to QCm1 from the plurality of controllers CT1 to CTm. In an embodiment, the qubit information received from the plurality of controllers CT1 to CTm may include physical information about types, a structure, a connection relationship, and the like of a plurality of qubits included in each of the plurality of quantum chips QC11 to QCm1. The physical qubit layer 111 may generate the physical qubit mapping that determines the connection relationship between a plurality of qubits, which are included in each of the plurality of quantum chips QC11 to QCm1, based on the qubit information. The physical qubit mapping is described in more detail with reference to FIG. 4.

The abstraction qubit layer 112 may receive the physical qubit mapping from the physical qubit layer 111, and then may generate abstraction qubit mapping based on the received physical qubit mapping. The abstraction qubit layer may include a plurality of abstraction qubits and a plurality of abstraction channels connecting between the plurality of abstraction qubits. An abstraction qubit may correspond to a physical qubit. In an embodiment, different physical features of a plurality of quantum chips may be blocked from propagating to an upper layer through the abstraction qubit mapping. That is, the abstraction qubit mapping or abstraction qubit layer may provide upper layers (e.g., the logical qubit layer 113, the application qubit layer 114, or the quantum application program 101) with the plurality of quantum chips QC11 to QCm1) in a consistent structure or in a single form. The abstraction qubit mapping is described in more detail with reference to FIG. 5.

The logical qubit layer 113 may receive the abstraction qubit mapping from the abstraction qubit layer 112, and may generate logical qubit mapping based on the received abstraction qubit mapping. The logical qubit mapping may include logical channels connecting between logical qubits and logical qubits. The logical qubits may indicate a group of abstraction qubits. In an embodiment, the number, structure, or locations of abstraction qubits included in one logical qubit may be determined based on a quantum error correction code. The quantum error correction code may include various error correction codes such as a surface code, a stean code, and the like. The logical qubit mapping and the logical qubit layer 113 will be described in more detail with reference to FIG. 6.

The application qubit layer 114 may receive the logical qubit mapping from the logical qubit layer 113. The application qubit layer 114 may allocate or map a qubit corresponding to the calculation requested by the quantum application program 101 based on the logical qubit mapping. The operation of the application qubit layer 114 will be described in more detail with reference to FIG. 7.

As described above, the management device 110 may perform a mapping operation, such that the quantum application program 101, which is an upper layer, recognizes that the plurality of quantum chips QC11 to QCm1 having different types have the same structure. Accordingly, the calculations and implementations for a plurality of quantum chips having different types may be efficiently performed. Moreover, because a user does not need to write the quantum application program 101 in different manners depending on the type of each of the plurality of quantum chips QC11 to QCm1, the structure of the quantum application program 101 may be simplified.

Figure 3:
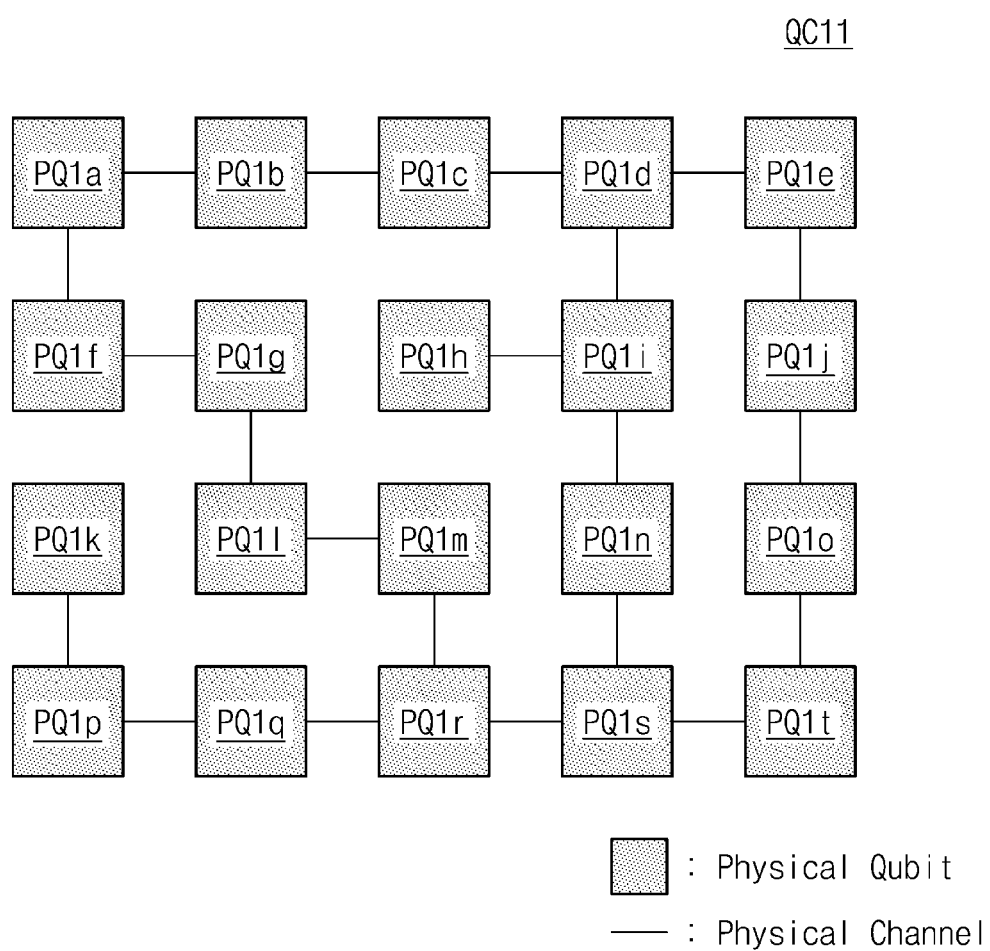
FIG. 3 is a view illustrating an example of one quantum chip among a plurality of quantum chips of FIG. 2.

FIG. 3 is a view illustrating an example of one quantum chip among a plurality of quantum chips of FIG. 2. For brevity of illustration and for convenience of description, the one quantum chip QC11 is described in FIG. 3. However, the scope of the present disclosure is not limited thereto. Each of the other quantum chips may have the identical or similar structure to the quantum chip QC11 shown in FIG. 3. Alternatively, the other quantum chips may have shapes that are different depending on types of quantum chips, but a detailed description thereof will be omitted for convenience of description.

Referring to FIGS. 2 and 3, the quantum chip QC11 may include a plurality of physical qubits PQ1a to PQ1t. The plurality of physical qubits PQ1a to PQ1t may be connected to each other through a physical channel. In an embodiment, the physical channel connecting between the plurality of physical qubits PQ1a to PQ1t may be based on the physical structure of the quantum chip QC11. One physical qubit may be connected to a part of the adjacent physical qubits. For example, the physical qubit PQ1h may be adjacent to the physical qubits PQ1b, PQ1c, PQ1d, PQ1g, PQ1i, PQ1l, PQ1m, and PQ1n. The physical qubit PQ1h may be connected to only the one physical qubit PQ1i among adjacent physical qubits PQ1b, PQ1c, PQ1d, PQ1g, PQ1i, PQ1l, PQ1m, and PQ1n through the physical channel. That is, the physical qubits PQ1h and PQ1i may perform a 2-qubit operation. On the other hand, because the physical qubit PQ1h is not connected to each of the other physical qubits PQ1b, PQ1c, PQ1d, PQ1g, PQ1l, PQ1m, and PQ1n (other than PQ1i) through the physical channel, the 2-qubit operation may not be performed. That is, the 2-qubit operation is not supported through all combinations of each of the plurality of physical qubits PQ1a to PQ1t. The 2-qubit operation is supported only through physical qubits connected through physical channels. In this case, the efficiency of the quantum chip QC11 may be reduced.

In an embodiment, the fact that physical qubits are adjacent to each other may mean that a physical distance or a logical distance between physical qubits is short. The logical distance between physical qubits may mean a distance by the architectural structure shown in FIG. 3.

Figure 4:
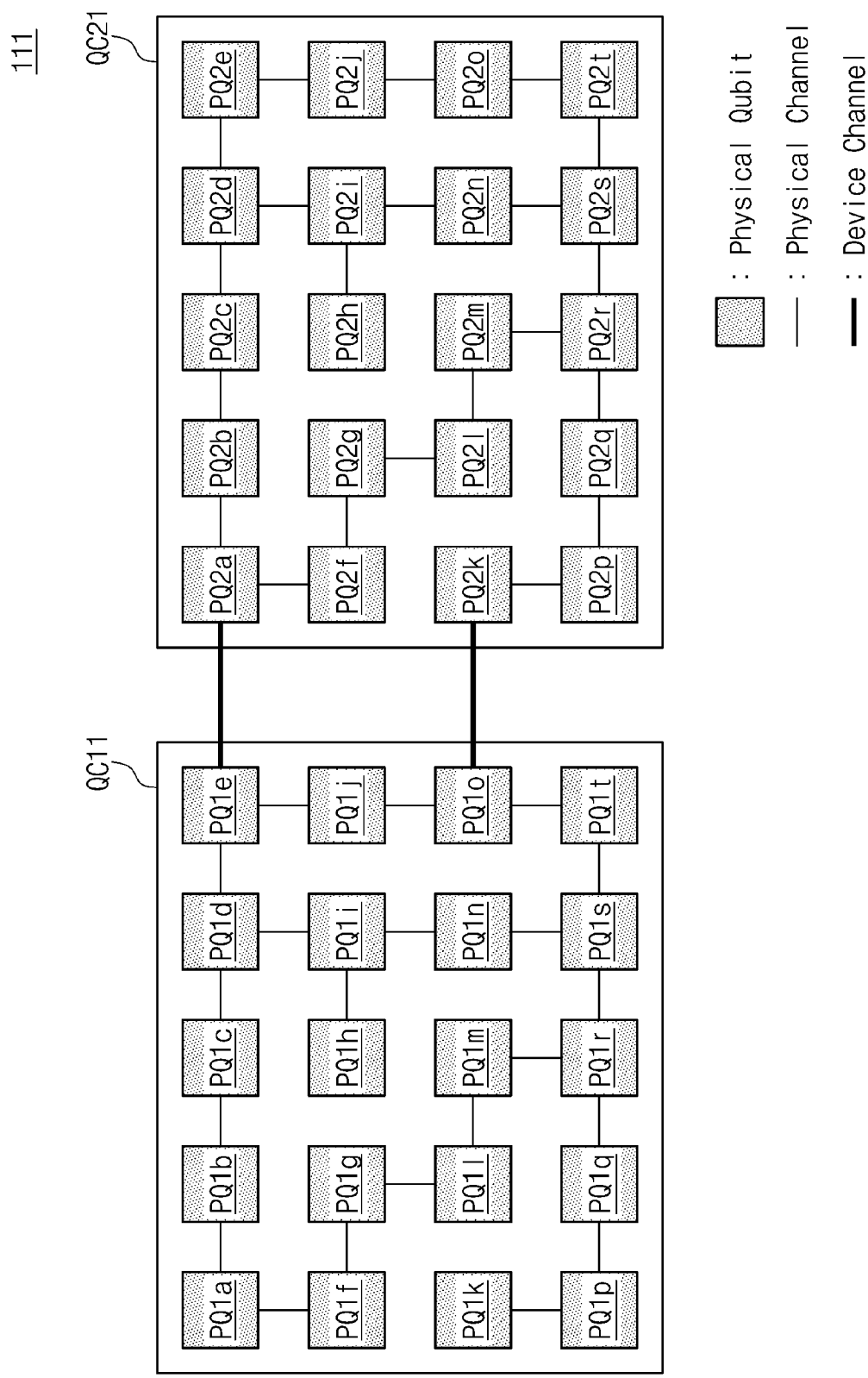
FIG. 4 is a diagram for describing a physical qubit layer of the management device of FIG. 2.

FIG. 4 is a diagram for describing a physical qubit layer of the management device of FIG. 2. For convenience of description, detailed descriptions associated with the components described above will be omitted to avoid redundancy. For brevity of the drawing, the operation of the physical qubit layer 111 is described with reference to some quantum chips (e.g., QC11 and QC21). However, the scope of the present disclosure is not limited thereto. For example, the physical qubit layer 111 may make a connection between the plurality of quantum chips QC11 to QCm1.

Referring to FIGS. 2 and 4, the quantum chip QC11 may include the plurality of physical qubits PQ1a to PQ1t and physical channels connecting between the plurality of physical qubits, and the quantum chip QC21 may include a plurality of physical qubits PQ2a to PQ2t and physical channels connecting between the plurality of physical qubits PQ2a to PQ2t. The structures of quantum chips QC11 and QC21 have been described above, and thus a detailed description thereof will be omitted.

The physical qubit layer 111 may generate physical qubit mapping based on the plurality of physical qubits PQ1a to PQ1t and PQ2a to PQ2t and physical channels in the quantum chips QC11 and QC21. For example, the physical qubit layer 111 may receive information about the structure of the quantum chip QC11 from the first controller CT1 configured to control the quantum chip QC11, and may make a connection relationship between the plurality of physical qubits PQ1a to PQ1t and physical channels in the quantum chip QC11 based on the received information. Likewise, the physical qubit layer 111 may receive information about the structure of the quantum chip QC21 from the second controller Ct2 configured to control the quantum chip QC21, and may make a connection relationship between the plurality of physical qubits PQ2a to PQ2t and physical channels in the quantum chip QC21 based on the received information.

Because the quantum chips QC11 and QC21 are controlled by different controllers (i.e., CT1 and Ct2), the quantum chips QC11 and QC21 are not physically connected to each other, and communication between the quantum chips QC11 and QC21 may not be supported. The physical qubit layer 111 according to an embodiment of the present disclosure may support communication between the quantum chips QC11 and QC21 through a device channel. In an embodiment, the device channel may be a communication channel virtualized by the physical qubit layer 111, not a direct communication channel between the quantum chips QC11 and QC21. In an embodiment, the device channel may be virtualized or implemented by the physical qubit layer 111. Alternatively, the device channel may be implemented through a channel between controllers (e.g., CT1 and Ct2) or the system bus 102 under the control of the physical qubit layer 111.

In an embodiment, the device channel may support communication between the quantum chips QC11 and QC21, but the scope of the present disclosure is not limited thereto. For example, the device channel may support communication or connection between some physical qubits (e.g., PQ1e, PQ1o) of the quantum chip QC11 and some physical qubits PQ2a and PQ2k of the quantum chip QC21.

As described above, as shown in FIG. 4, the physical qubit layer 111 may generate and manage information about the physical connection between the plurality of physical qubits PQ1a to PQ1t and PQ2a to PQ2t of the quantum chips QC11 and QC21 through the physical qubit mapping.

Figure 5:
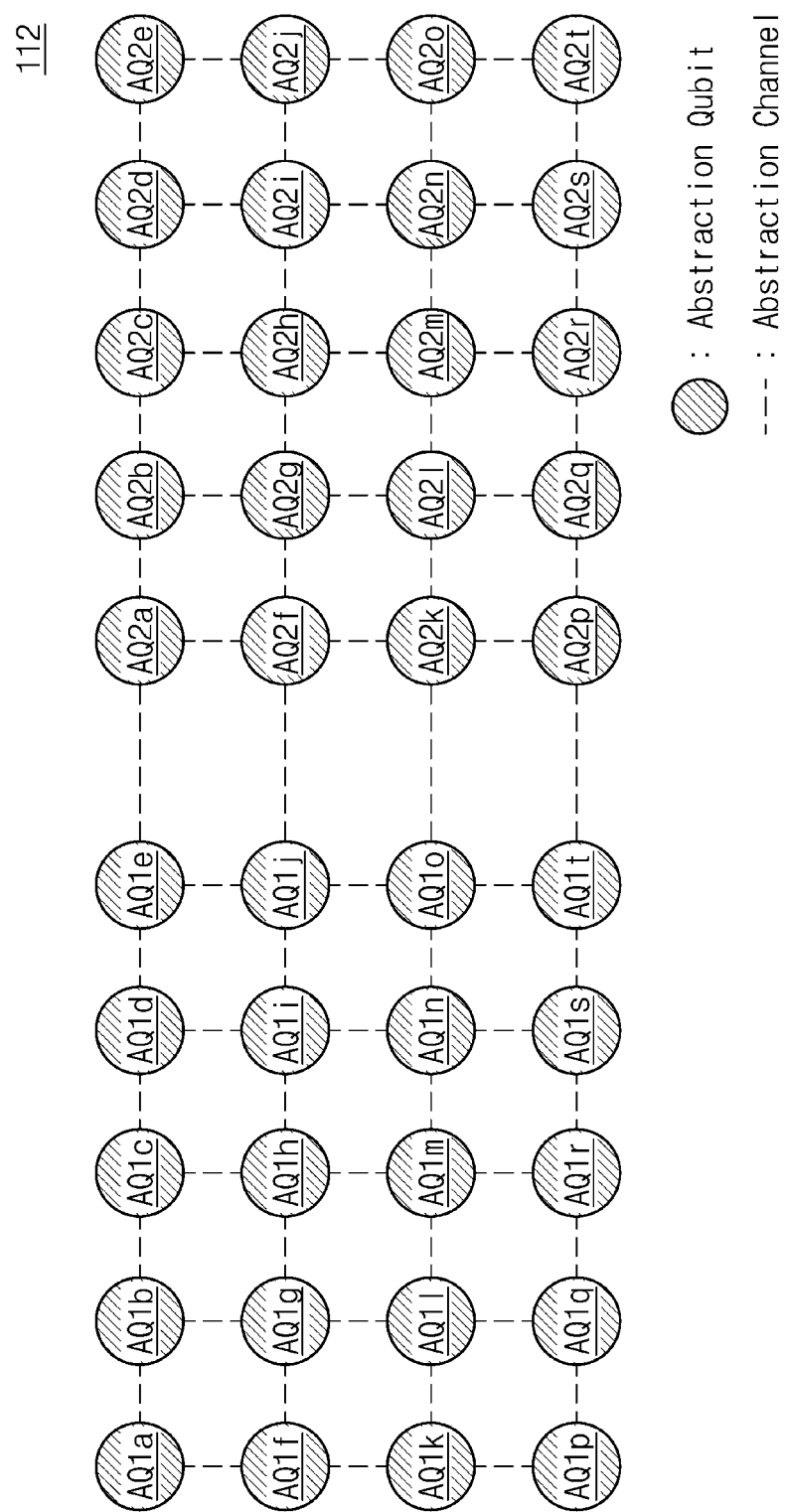
FIG. 5 is a diagram for describing an abstraction qubit layer of the management device of FIG. 2.

FIG. 5 is a diagram for describing an abstraction qubit layer of the management device of FIG. 2. For convenience of description, detailed descriptions associated with the components described above will be omitted to avoid redundancy. Referring to FIGS. 2, 4, and 5, the abstraction qubit layer 112 may generate abstraction qubit mapping based on the physical qubit mapping described with reference to FIG. 4. The abstraction qubit mapping may include information about abstraction qubits and abstraction channels between the abstraction qubits.

For example, the abstraction qubit layer 112 may generate a plurality of abstraction qubits AQ1a to AQ1t and AQ2a to AQ2t based on the physical qubit mapping from the physical qubit layer 111. The plurality of abstraction qubits AQ1a to AQ1t and AQ2a to AQ2t may correspond to the plurality of physical qubits PQ1a to PQ1t and PQ2a to PQ2t of the physical qubit mapping one-to-one. However, the scope of the present disclosure is not limited thereto. The plurality of abstraction qubits AQ1a to AQ1t and AQ2a to AQ2t may have a mapping relationship with the plurality of physical qubits PQ1a to PQ1t and PQ2a to PQ2t in various manners such as one-to-one mapping, many-to-one mapping, and many-to-many mapping, based on physical features of the quantum chips QC11 and QC21, physical features of physical qubits, and the like.

The abstraction qubit layer 112 may generate abstraction channels connecting between the plurality of abstraction qubits AQ1a to AQ1t and AQ2a to AQ2t. The abstraction channels may provide a connection or communication between abstraction qubits. The abstraction qubit layer 112 may support various types of qubit operations through abstraction channels. In an embodiment, unlike the physical channels described with reference to FIG. 4, the abstraction channels may be communication channels logically implemented in the abstraction qubit layer 112.

For example, the physical qubits PQ1b and PQ1g of FIG. 4 may not be directly connected to each other through a physical channel. That is, a 2-qubit gate operation through the physical qubits PQ1b and PQ1g may not be directly performed. On the other hand, according to the abstraction qubit mapping generated by the abstraction qubit layer 112, the abstraction qubits AQ1b and AQ1g corresponding to the physical qubits PQ1b and PQ1g are connected to each other through an abstraction channel. Accordingly, the 2-qubit gate operation may not be directly performed through the physical qubits PQ1b and PQ1g. However, the 2-qubit gate operation through the abstraction qubits AQ1b and AQ1g may be supported based on the abstraction qubit mapping. In more detail, a shift or swap between the physical qubits PQ1b and PQ1f may be required for the 2-qubit gate operation through the physical qubits PQ1b and PQ1g. The shift or swap between the physical qubits PQ1b and PQ1f may be abstracted through the abstraction channel of the abstraction qubits AQ1b and AQ1g. In other words, the abstraction channel may be a configuration that abstracts the actual connection relationship between abstraction qubits and corresponding physical qubits.

In an embodiment, the abstraction channel between abstraction qubits may be implemented or determined based on the features of quantum chips or physical qubits. For example, in the calculation of physical qubits, the calculation execution time and the coherence time may be different depending on the type of the quantum chip or the physical qubit. In a quantum computing system, the relative calculation time of a physical qubit relative to the coherence time is more important than the absolute calculation time of a physical qubit. Accordingly, the abstraction qubit layer 112 may implement or determine abstraction channels between abstraction qubits based on a ratio of the calculation time of a physical qubit to the coherence time of the physical qubit according to types of quantum chips.

In more detail, the ratio of the calculation time of a physical qubit to the coherence time of the physical qubit may be calculated as in Equation 1.

$$\alpha = \frac{\text{Time\_ext}}{\text{Time\_coh}} \times REF \quad \text{[Equation 1]}$$

Referring to Equation 1, α denotes a ratio of the calculation time of a physical qubit to the coherence time of the physical qubit, that is, a relative time; Time_ext denotes the calculation time of a physical qubit; Time_coh denotes the coherence time of a physical qubit; and, REF denotes a reference value. Table 1 shows an example of a relative time for various calculations in an embodiment in which the quantum chip QC11 includes superconductor-based physical qubits, and the quantum chip QC21 includes trapping ion-based physical qubits.

TABLE 1

| Type | Superconductor-based quantum chip | | | Trapping ion-based quantum chip | | |
|---|---|---|---|---|---|---|
| | Coherence time | | | | | |
| | 10 μs | | | 50 μs | | |
| | Calculation | Execution time | Relative time | Calculation | Execution time | Relative time |
| Pauli gate | X | 20 ns | 20 | X | 10 μs | 2 |
| | Y | 20 ns | 20 | Y | 10 μs | 2 |
| | Z | 20 ns | 20 | Z | 10 μs | 2 |
| Clifford gate | H | 30 ns | 30 | H | 20 μs | 4 |
| | CNOT | 40 ns | 40 | CNOT | 40 μs | 8 |
| | S | 30 ns | 30 | S | 20 μs | 4 |
| Measurement | M | 800 ns | 800 | M | 400 μs | 80 |

Values shown in Table 1 are values calculated based on Equation 1, and a detailed description thereof will be omitted to avoid redundancy. As disclosed in Table 1, the coherence time of a superconductor-based quantum chip is 10 μs, and the coherence time of a trapping ion-based quantum chip is 50 μs. Accordingly, the coherence time of a superconductor-based quantum chip is shorter than the coherence time of a trapping ion-based quantum chip. In addition, in each calculation, the execution time of a superconductor-based quantum chip is short than the execution time of a trapping ion-based quantum chip. In other words, the abstraction qubit layer 112 of the management device 110 according to an embodiment of the present disclosure may implement an abstraction channel based on the ratio of a coherence time to a calculation time, not simply the calculation time or execution time of physical qubits of quantum chips. In an embodiment, the abstraction qubit mapping generated through the operation of the abstraction qubit layer 112 described above may provide regular connectivity. For example, the physical channel between physical qubits is based on the physical configuration implemented inside the actual quantum chip, and thus the physical qubit mapping described with reference to FIG. 4 has irregular connectivity. On the other hand, the abstraction channel of the abstraction qubit mapping abstracted by the abstraction qubit layer 112 may provide regular connectivity through the abstraction channels.

In an embodiment, the abstraction qubit layer 112 may be configured to manage physical qubit resources. For example, the abstraction qubit layer 112 may measure the fidelity of the physical qubit periodically or randomly, and then may exclude a physical qubit having fidelity of the reference value or less. In an embodiment, the excluded physical qubit may not be used as an abstraction qubit or may not correspond to an abstraction qubit. Alternatively, the abstraction qubit layer 112 may correspond or map physical qubits having fidelity of a reference value or more to abstraction qubits.

Figure 6:
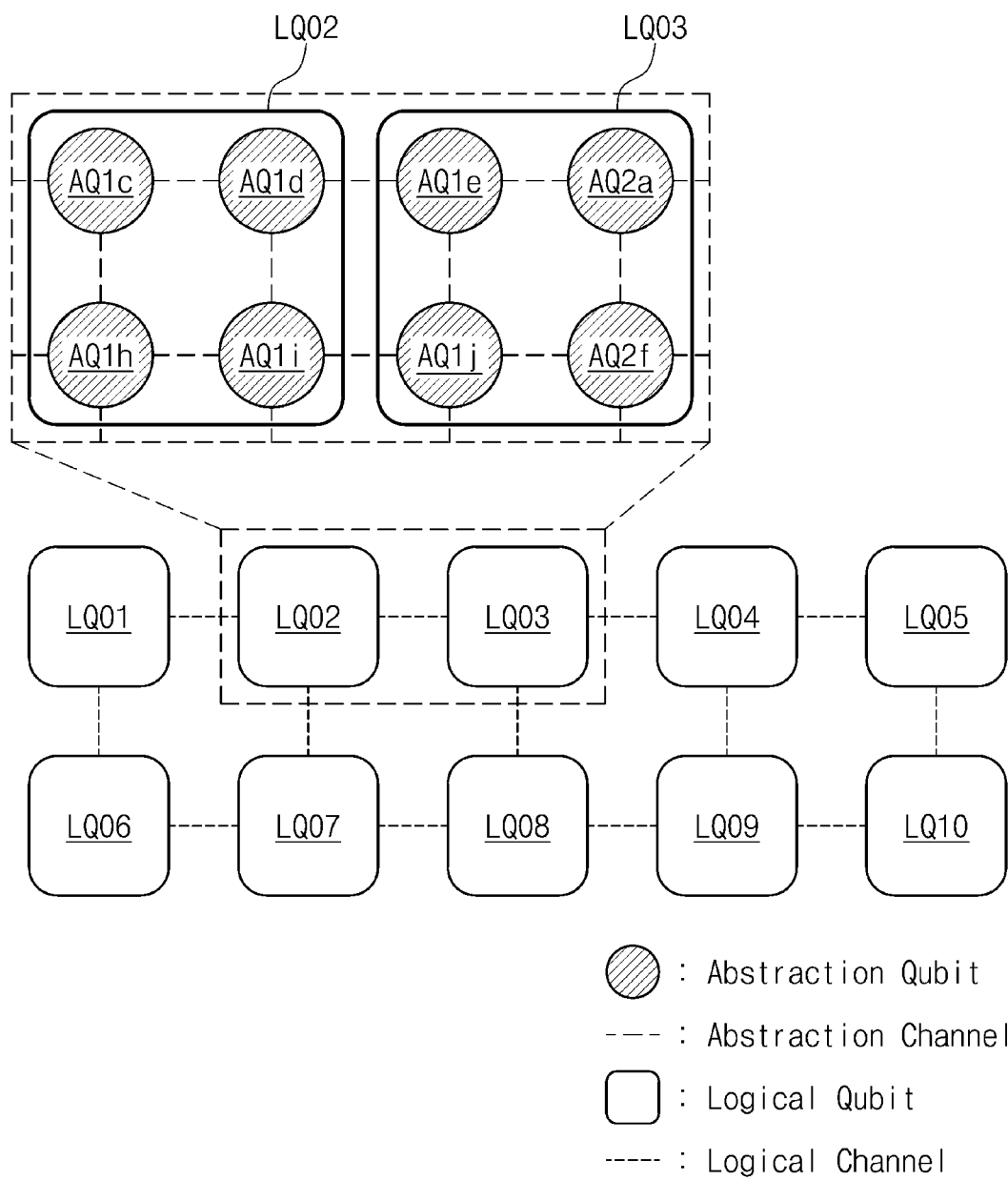
FIG. 6 is a diagram for describing a logical qubit layer of the management device of FIG. 2.

FIG. 6 is a diagram for describing a logical qubit layer of the management device of FIG. 2. For convenience of description, detailed descriptions associated with the components described above will be omitted to avoid redundancy. Referring to FIGS. 2, 5, and 6, the logical qubit layer 113 may generate logical qubit mapping based on abstraction qubit mapping. The logical qubit mapping may include a plurality of logical qubits LQ01 to LQ10 and logical channels.

Each of the plurality of logical qubits LQ01 to LQ10 may include predetermined abstraction qubits. For example, the logical qubit layer 113 may separate or divide the plurality of abstraction qubits AQ1a to AQ1t and AQ2a to AQ2t included in the abstraction qubit mapping into the plurality of logical qubits LQ01 to LQ10, based on a quantum error correction code. For example, as shown in FIG. 6, one logical qubit may include 4 abstraction qubits. In more detail, the second logical qubit LQ02 may include four abstraction qubits AQ1c, AQ1d, AQ1h, and AQ1i. The third logical qubit LQ03 may include four abstraction qubits AQ1e, AQ2a, AQ1j, and AQ2f. The second and third logical qubits LQ02 and LQ03 may be connected to each other through a logical channel.

In an embodiment, the quantum error correction code may include various quantum error correction codes used to correct a quantum error, such as a surface code, a stean code, and the like. In an embodiment, the number of abstraction qubits included in one logical qubit may vary depending on the type of the quantum error correction code. In an embodiment, as the number of abstraction qubits included in one logical qubit increases, an error rate of one logical qubit is reduced (i.e., an error correction rate is improved), but the total number of logical qubits may be reduced. In an embodiment, the type of the quantum error correction code may be determined based on the scale of logical qubits, an error rate of logical qubits, or the like, which is required by a quantum application program.

As described above, the logical qubit layer 113 may generate logical qubit mapping based on the abstraction qubit mapping from the abstraction qubit layer 112.

Figure 7:
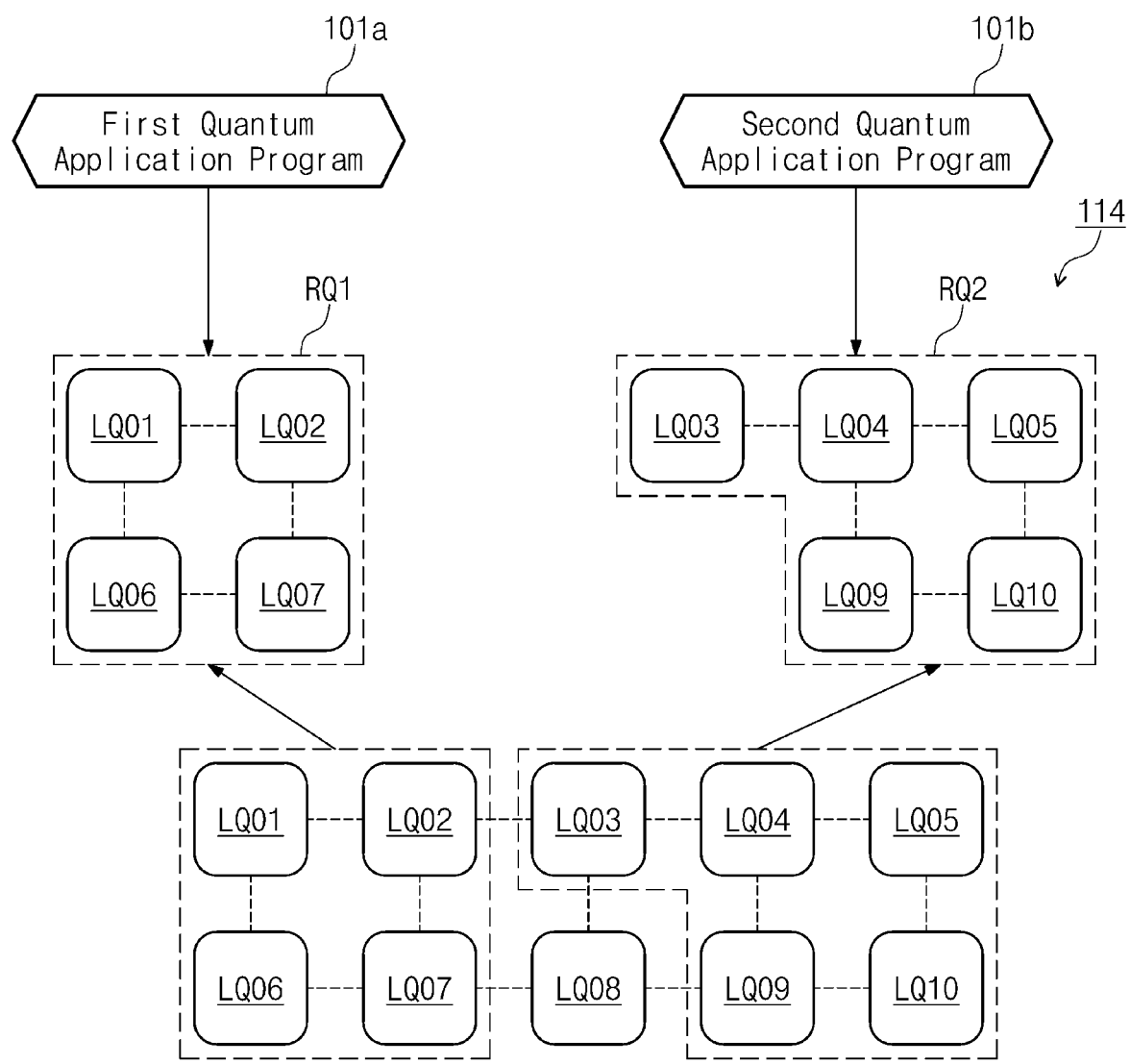
FIG. 7 is a diagram for describing an application qubit layer of the management device of FIG. 2.

FIG. 7 is a diagram for describing an application qubit layer of the management device of FIG. 2. For convenience of description, detailed descriptions associated with the components described above will be omitted to avoid redundancy. Referring to FIGS. 2, 6, and 7, the application qubit layer 114 may allocate logical qubits to quantum application programs 101a and 101b in response to requests RQ1 and RQ2 from the quantum application programs 101a and 101b.

For example, the application qubit layer 114 may receive logical qubit mapping from the logical qubit layer 113. The application qubit layer 114 may receive the first request RQ1 from the first quantum application program 101a. The first request RQ1 may be a request for four qubits. In this case, the application qubit layer 114 may allocate four logical qubits LQ01, LQ02, LQ06, and LQ07 to the first quantum application program 101 a based on the logical qubit mapping. The first quantum application program 101 a may perform calculations by using the allocated four logical qubits LQ01, LQ02, LQ06, and LQ07.

The application qubit layer 114 may receive the second request RQ2 from the second quantum application program 101b. The second request RQ2 may be a request for five qubits. In this case, the application qubit layer 114 may allocate five logical qubits LQ03, LQ04, LQ05, LQ09, and LQ10 to the second quantum application program 101b based on the logical qubit mapping. The second quantum application program 101b may perform calculations by using the allocated five logical qubits LQ03, LQ04, LQ05, LQ09, and LQ10.

In an embodiment, as described above, each of the logical qubits may include a plurality of abstraction qubits, and each of a plurality of abstraction qubits may correspond to physical qubits of a quantum chip. That is, each of the first and second quantum application programs 101a and 101b may perform calculations by using the allocated logical qubits. In this case, the management device 110 may be configured to manage the mapping between logical qubits and physical qubits.

In an embodiment, quantum chips may have different types. However, as described above, the management device 110 may provide quantum application programs with different types of quantum chips or physical qubits as logical qubits in a uniform or regular form, through the physical qubit layer 111, the abstraction qubit layer 112, the logical qubit layer 113, and the application qubit layer 114. Accordingly, the resource use efficiency of a quantum computing system in which various types of quantum chips are integrated may be improved.

For example, in a conventional quantum computing system, when types of quantum chips are different from one another, different quantum application programs are required due to different physical features. In addition, physical qubits may not be efficiently allocated due to the limitation of the physical connection between physical qubits. In an embodiment, the physical features of quantum chips or physical qubits may include at least one of a coherence time, an error rate, a gate calculation time, connectivity between qubits, and a quantum information communication execution time between qubits.

On the other hand, according to an embodiment of the present disclosure, uniform connectivity may be provided to a quantum application program (i.e., an upper layer) with respect to all the plurality of quantum chips, regardless of the physical connectivity of physical qubits and the type of a quantum chip. In more detail, in the embodiment shown in FIG. 7, the third logical qubit LQ03 may be allocated to the second quantum application program 101b. At this time, the third logical qubit LQ03 includes abstraction qubits AQ1e, AQ2a, AQ1j, and AQ2f as shown in FIG. 6. As described with reference to FIGS. 4 and 5, the abstraction qubits AQ1e, AQ2a, AQ1j, and AQ2f correspond to physical qubits PQ1e, PQ2a, PQ1j, and PQ2f, respectively. At this time, the physical qubits PQ1e and PQ1j among physical qubits are included in the first quantum chip QC11. The physical qubits PQ2a and PQ2f among the physical qubits are included in the second quantum chip QC21. As a result, physical qubits included in different quantum chips may be allocated to a single quantum application program.

Figure 8:
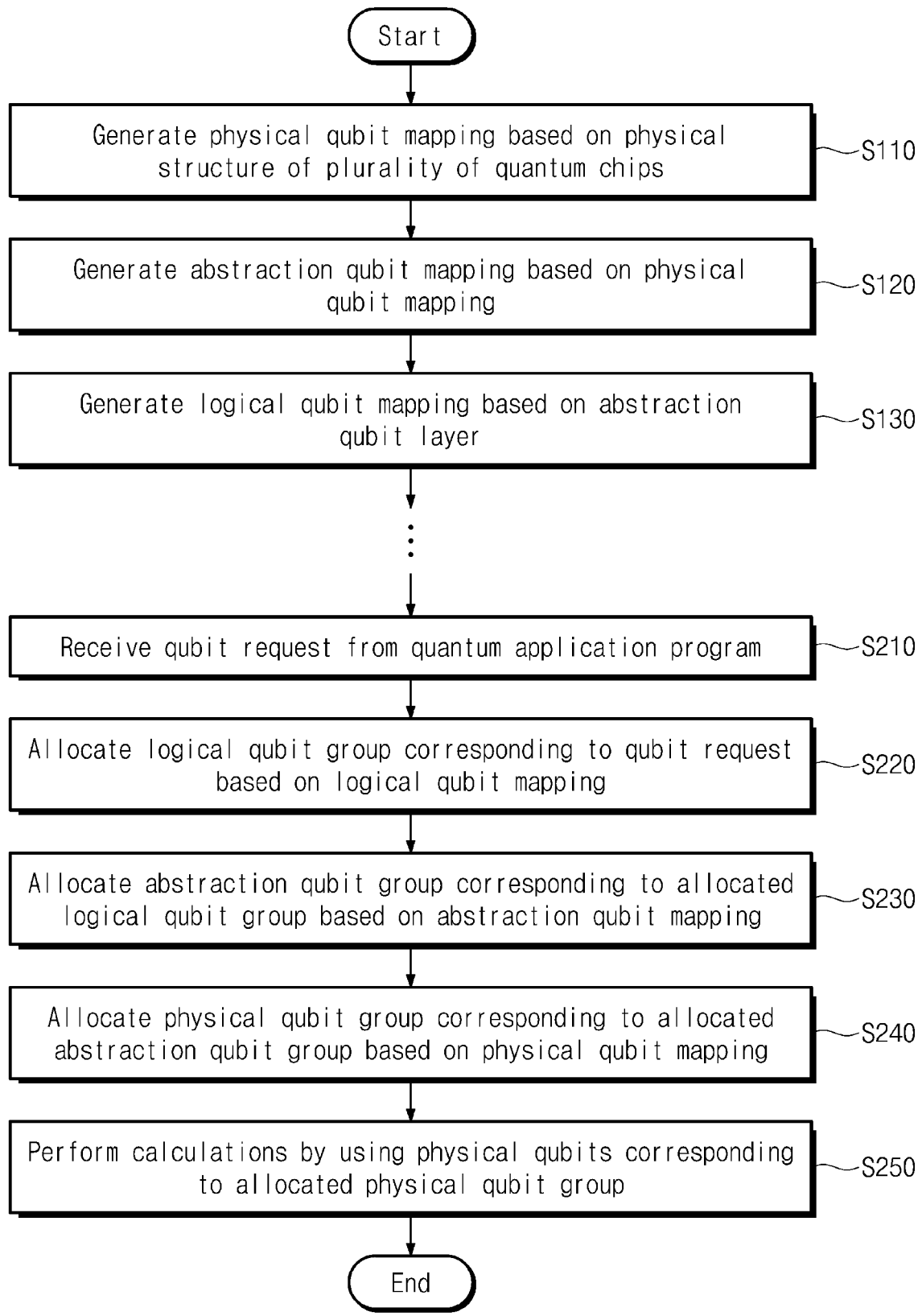
FIG. 8 is a flowchart illustrating an operation of the management device of FIG. 2.

FIG. 8 is a flowchart illustrating an operation of the management device of FIG. 2. For convenience of description, detailed descriptions associated with the components described above will be omitted to avoid redundancy. Referring to FIGS. 2 and 8, in operation S110, the management device 110 may generate physical qubit mapping based on the physical structure of a plurality of quantum chips. For example, the plurality of quantum chips QC11 to QCm1 of the quantum computing system 100 may be implemented in different types. Each of the plurality of quantum chips QC11 to QCm1 may have a different physical structure. The physical qubit layer 111 of the management device 110 may generate physical qubit mapping, which defines a physical connection relationship between a plurality of physical qubits of each of the plurality of quantum chips QC11 to QCm1, based on the embodiment described with reference to FIG. 4. Operation S110 is similar to an operation described with reference to FIG. 4, and thus, additional description will be omitted to avoid redundancy.

In operation S120, the management device 110 may generate abstraction qubit mapping based on the physical qubit mapping. For example, the abstraction qubit layer 112 of the management device 110 may generate the abstraction qubit mapping, which is obtained by abstracting the physical qubit mapping, based on the physical qubit mapping. The abstraction qubit mapping may include a plurality of abstraction qubits and abstraction channels connecting between the plurality of abstraction qubits. The abstraction qubit mapping and a generation method thereof are similar to those described with reference to FIG. 5, and thus, detailed descriptions will be omitted to avoid redundancy.

In operation S130, the management device 110 may generate a logical qubit layer based on the abstraction qubit layer. For example, the logical qubit layer 113 of the management device 110 may generate logical qubit mapping based on the abstraction qubit layer. The logical qubit mapping may include a plurality of logical qubits and logical channels connecting between the plurality of logical qubits. Each of the plurality of logical qubits may include the plurality of abstraction qubits. The number of abstraction qubits included in one logical qubit may be determined based on a quantum error correction code. The logical qubit mapping and a generation method thereof are similar to those described with reference to FIG. 6, and thus, detailed descriptions will be omitted to avoid redundancy.

Through operation S110 to operation S130 described above, the management device 110 of the quantum computing system 100 may generate various mappings for providing an upper layer (i.e., a quantum application program) with the same type of a qubit layer with respect to heterogeneous quantum chips.

In an embodiment, the above-described mapping generation operation (i.e., operation S110 to operation S130) may be performed in an initialization operation of the quantum computing system 100 or may be performed periodically or randomly during an operation.

The management device 110 of the quantum computing system 100 may perform a calculation operation through operation S210 to operation S250. In operation S210, the management device 110 may receive a qubit request from the quantum application program 101.

In operation S220, the management device 110 may allocate logical qubits or a logical qubit group corresponding to the qubit request based on the logical qubit mapping. For example, the application qubit layer 114 of the management device 110 may allocate the logical qubits or the logical qubit group corresponding to the qubit request, which is received from the quantum application program 101, based on the logical qubit mapping.

In operation S230, the management device 110 may allocate an abstraction qubit group corresponding to the allocated logical qubit group based on the abstraction qubit mapping. For example, the logical qubit layer 113 of the management device 110 may allocate the abstraction qubit group corresponding to the allocated logical qubit group based on the abstraction qubit mapping.

In operation S240, the management device 110 may allocate a physical qubit group corresponding to the allocated abstraction qubit group based on the physical qubit mapping. For example, the abstraction qubit layer 112 of the management device 110 may allocate the physical qubit group corresponding to the allocated abstraction qubit group based on the physical qubit mapping.

In operation S250, the management device 110 may perform calculations by using physical qubits corresponding to the allocated physical qubit group. For example, the physical qubit layer 111 of the management device 110 may control the plurality of controllers CT1 to CTm such that the calculations are performed based on the physical qubit corresponding to the assigned physical qubit group.

As described above, according to an embodiment of the present disclosure, the management device 110 may perform a conversion operation through various layers such that the quantum application program recognizes or identifies that quantum chips implemented in different types have the same type. Accordingly, resource utilization of physical qubits may be improved.

Figure 9:
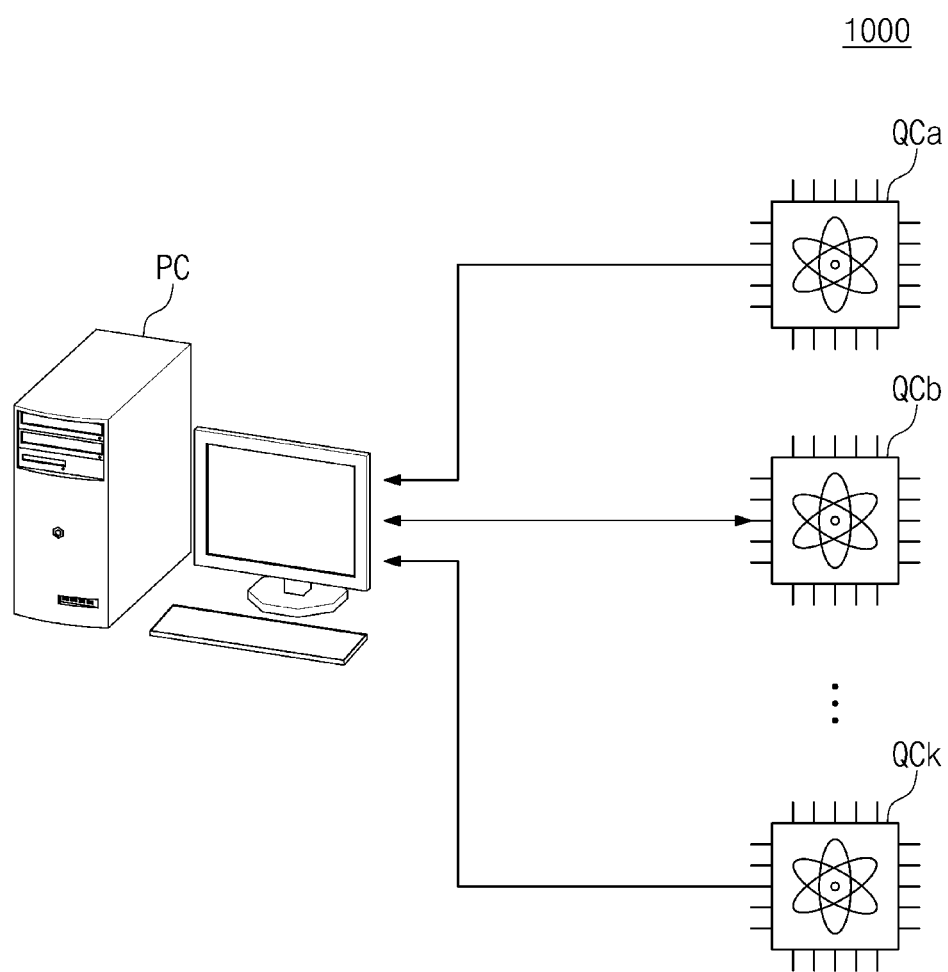
FIG. 9 is a conceptual diagram illustrating a quantum computing system, according to an embodiment of the present disclosure.

FIG. 9 is a conceptual diagram illustrating a quantum computing system, according to an embodiment of the present disclosure. Referring to FIG. 9, a quantum computing system 1000 may include a computer PC and a plurality of quantum chips QCa to QCk. The computer PC may be a commonly-used classic computer such as a binary computer or a general-purpose computer. In an embodiment, the computer PC may be the management device 110 described with reference to FIGS. 1 to 8. In an embodiment, the computer PC may be a device configured to write or store the quantum application program 101 described with reference to FIGS. 1 to 8.

Each of the plurality of quantum chips QCa to QCk may include physical qubits implemented in different types. The plurality of quantum chips QCa to QCk may be implemented with different devices or may be implemented to have different quantum types within one device.

The computer PC may communicate with the plurality of quantum chips QCa to QCk via a communication channel or a system bus. In an embodiment, the communication between the plurality of quantum chips QCa to QCk may be provided depending on the implementation manner.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

According to an embodiment of the present disclosure, a quantum chips implemented in different types may be used efficiently. Accordingly, a quantum computing system having improved efficiency and an operating method thereof are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A quantum computing system comprising:
a first quantum chip including a plurality of first physical qubits;
a second quantum chip including a plurality of second physical qubits; and
a management device configured to manage the first quantum chip and the second quantum chip,
wherein the management device includes:
a physical qubit layer configured to manage physical qubit mapping including information about physical channels between the plurality of first physical qubits and the plurality of second physical qubits;

an abstraction qubit layer configured to manage abstraction qubit mapping including information about a plurality of abstraction qubits, which correspond to the plurality of first physical qubits and the plurality of second physical qubits, and abstraction channels between the plurality of abstraction qubits based on the physical qubit mapping;

a logical qubit layer configured to divide the plurality of abstraction qubits into a plurality of logical qubits and to manage logical qubit mapping including information about logical channels between the plurality of logical qubits, based on the abstraction qubit mapping; and an application qubit layer configured to allocate at least one logical qubit corresponding to a qubit request received from a quantum application program based on the logical qubit mapping.

2. The quantum computing system of claim 1, wherein the plurality of first physical qubits and the plurality of second physical qubits have different physical features from one another, and wherein the physical features include at least one of a coherence time, an error rate, a gate calculation time, connectivity between qubits, and a quantum information communication execution time between qubits.

3. The quantum computing system of claim 1, wherein the physical channels of the physical qubit mapping have irregular connectivity between the plurality of first physical qubits and the plurality of second physical qubits.

4. The quantum computing system of claim 3, wherein the physical qubit mapping further includes information about a device channel between the first quantum chip and the second quantum chip.

5. The quantum computing system of claim 3, wherein the abstraction channels of the abstraction qubit mapping have regular connectivity between the plurality of abstraction qubits.

6. The quantum computing system of claim 1, wherein the abstraction qubit layer measures fidelity of each of the plurality of first physical qubits and each of the plurality of second physical qubits and maps a physical qubit, which has fidelity of a reference value or more, from among the plurality of first physical qubits and the plurality of second physical qubits onto the plurality of abstraction qubits.

7. The quantum computing system of claim 1, wherein the abstraction channels of the abstraction qubit mapping include a swap operation between physical qubits corresponding to the plurality of abstraction qubits.

8. The quantum computing system of claim 1, wherein the logical qubit mapping divides the plurality of abstraction qubits into the plurality of logical qubits based on a quantum error correction code.

9. The quantum computing system of claim 8, wherein the number of abstraction qubits included in one of the plurality of logical qubits is determined based on a type of the quantum error correction code.

10. The quantum computing system of claim 9, wherein the logical qubit layer determines the type of the quantum error correction code based on the number of the plurality of abstraction qubits, the number of the plurality of logical qubits, and an error rate of each of the plurality of logical qubits.

11. The quantum computing system of claim 1, further comprising:
a first controller configured to control the first quantum chip; and
a second controller configured to control the second quantum chip.

12. The quantum computing system of claim 1, further comprising:
a first controller configured to control the first quantum chip and the second quantum chip.

13. The quantum computing system of claim 1, wherein the management device includes:
a memory configured to store a program code for the physical qubit layer, the abstraction qubit layer, the logical qubit layer, and the application qubit layer;
a central processing unit configured to execute the program code stored in the memory; and
an interface device configured to provide communication between the first quantum chip and the second quantum chip.

14. An operating method of a quantum computing system including a plurality of quantum chips, the method comprising:
generating physical qubit mapping including information about a plurality of physical qubits, which are included in each of the plurality of quantum chips, and physical channels between the plurality of physical qubits based on a physical structure of the plurality of quantum chips;
generating abstraction qubit mapping including information a plurality of abstraction qubits, which correspond to the plurality of physical qubits, and abstraction channels between the plurality of abstraction qubits based on the physical qubit mapping; and
dividing the plurality of abstraction qubits into a plurality of logical qubits based on the abstraction qubit mapping and generating logical qubit mapping including information about the plurality of logical qubits and logical channels between the plurality of logical qubits,
wherein the physical channels of the physical qubit mapping have irregular connectivity between the plurality of physical qubits, and
wherein the abstraction channels of the abstraction qubit mapping have regular connectivity between the plurality of abstraction qubits.

15. The method of claim 14, further comprising:
receiving a qubit request from a quantum application program;
allocating logical qubits, which correspond to the qubit request, from among the plurality of logical qubits based on the logical qubit mapping;
allocating abstraction qubits, which correspond to the allocated logical qubits, from among the plurality of abstraction qubits based on the abstraction qubit mapping;
allocating physical qubits, which correspond to the allocated abstraction qubits, from among the plurality of physical qubits based on the physical qubit mapping; and
performing a calculation corresponding to the qubit request by using the allocated physical qubits.

16. The method of claim 14, wherein the plurality of quantum chips have different types from one another.

* * * * *